United States Patent [19]

Kawase et al.

[11] Patent Number: 5,774,455
[45] Date of Patent: Jun. 30, 1998

[54] DATA TRANSMISSION APPARATUS AND METHOD AND DATA COMMUNICATION SYSTEM CONDUCTING VARIABLE BIT-RATE DATA TRANSMISSION

[75] Inventors: Fumiyoshi Kawase, Iwatsuki; Takanori Hisanaga; Koh Kamizawa, both of Nakai-machi, all of Japan

[73] Assignee: Fuji Xerox Co., Ltd., Tokyo, Japan

[21] Appl. No.: 666,234

[22] Filed: Jun. 20, 1996

[30] Foreign Application Priority Data

Jun. 21, 1995 [JP] Japan .................................. 7-154618

[51] Int. Cl.⁶ ........................................... H04J 3/16
[52] U.S. Cl. ............................... 370/232; 370/468
[58] Field of Search ............................ 370/229, 230, 370/231, 232, 233, 234, 235, 236, 395, 465, 468; 395/200.13

[56] References Cited

U.S. PATENT DOCUMENTS

| 5,280,470 | 1/1994 | Buhrke et al. ..................... 370/232 |
| 5,313,454 | 5/1994 | Bustini et al. ..................... 370/231 |
| 5,400,329 | 3/1995 | Tokura et al. ..................... 370/232 |
| 5,515,359 | 5/1996 | Zheng ............................... 370/231 |
| 5,579,301 | 11/1996 | Ganson et al. ..................... 370/229 |
| 5,633,859 | 5/1997 | Jain et al. ......................... 370/234 |
| 5,633,861 | 5/1997 | Hanson et al. ..................... 370/232 |

OTHER PUBLICATIONS

Technical Report of IEICE, SSE94–6, IN94–6 (1994–04), The Institute of Electronics, Information and Communication Engineers, Dept. of Elec. and Commun. Eng., Waseda University, "A Study on VBR Video Transmission using Traffic Shaping", Masahiro Inoue et al., pp. 31–36.

Primary Examiner—Chau Nguyen
Attorney, Agent, or Firm—Oliff & Berridge, PLC

[57] ABSTRACT

A digital data transmission apparatus includes a digital data buffer for storing digital data to be transmitted, a digital data transmitter for outputting the digital data stored in the digital data buffer to a transmission path, and a controller for controlling a transmission rate, which is an amount of data output per a unit time by the digital data transmitter, so that the transmission rate increases in accordance with passage of time.

5 Claims, 7 Drawing Sheets

DATA TRANSMISSION APPARATUS AND METHOD AND DATA COMMUNICATION SYSTEM CONDUCTING VARIABLE BIT-RATE DATA TRANSMISSION

BACKGROUND OF THE INVENTION

1. Field of the Invention

The present invention relates to a data transmission apparatus and a data transmission method conducting variable bit-rate data transmission, and a data communication system using thereof. For example, the present invention relates to rate control in communication terminals which carry out variable bit-rate high-speed data transmission point-to-point between a transmitting terminal and a receiving terminal through a transmission path.

2. Discussion of the Related Art

One of the examples of the high-speed data network is the Broadband Integrated Services Digital Network (B-ISDN) prescribed by the ITU-T Recommendation. The transfer mode used in the B-ISDN is the Asynchronous Transfer Mode (ATM) which divides information into the 53-byte packets called cells and carries out the variable bit-rate transmission via ATM switches, whereby it is possible to execute multiplexing of connection by the variable speed service.

In the ATM, it is possible to provide a communication speed with flexibility from low to high by the variable speed service such as ATM Adaptation Layer (AAL) 2, 3/4 or 5 prescribed by the ITU-T recommendation I. 362 and 363. Furthermore, statistical multiplexing effect such as absorption of time variation in the transmission rate of each connection can be obtained by label multiplexing of the cell; therefore the economical use of the network is expected.

In the network using the ATM, flow control is not executed between the nodes, but the transmission rate such as video data is controlled in the ATM switch by linear prediction, a method of prediction based on the past status of the transmission rate, of the amount of transmission. However, there are various forms of generation of information and various continuation times of generation of information depending on types of medium such as voice or video, or application using the information, or the like, which makes it difficult to predict the state of generation of information. In the case of data transmission for such information, the statistical multiplexing effect is unavailable owing to low multiplexing degree. As a result, temporary traffic concentration occurs in the constituents of the network such as exchanger, multiplexer or transmission link, thus having a possibility of causing buffer overflow or congestion.

FIG. 6 is a system construction view illustrating an example of occurrence of the congestion in the network using the ATM. In the figure, reference numerals 61, 62 and 63 are ATM terminals and 64, 65 and 66 are ATM switches. The construction of the network is first described. The ATM terminal 61 is connected to the ATM switch 65 through the ATM switch 64 and the ATM terminal 62 is connected to the ATM switch 65 through the ATM switch 66. The ATM terminal 63 is directly connected to the ATM switch 65. In each of the ATM switches 64, 65 and 66, the transmission rate, namely the amount of data transmitted per unit time is controlled by linear prediction. Accordingly, if the transmission rate of coming data is within the range of prediction, no congestion occurs.

However, if the data is concentratedly transmitted from the ATM terminals 61 and 62 simultaneously to a specific ATM terminal 63, sometimes the transmission rate of the data to be transmitted to the ATM terminal 63 exceeds the range of the linear prediction and the congestion occurs in the ATM switch 65. In such a case, cell loss occurs in a constituent of the network, in this example, the ATM switch 65. Therefore, a problem occurs that the quality of service (QOS) of the ATM network previously agreed upon cannot be guaranteed.

As the means for overcoming the occurrence of the congestion in the network, traffic shaping by the communication terminal is conventionally known. The technique of the traffic shaping is shown in "A Study on VBR Video Transmission using Traffic Shaping", M. Inoue et al., Technical Report of IBICE, SSE94-6, IN94-6 (1994-04), pp. 31–36. The traffic shaping restrains simultaneous occurrence of continuous generation of cells and momentary rise of the transmission rate. To carry this out, the rate control is conducted by buffering on the side of cell transmitting to transmit cells with adequate intervals.

FIG. 7 shows a concept of conventional traffic shaping. In the figure, the reference numeral 71 is a data generator, 72 is a traffic shaper, and 73 is a network interface. The data generator 71 is connected to the network interface 73 through the traffic shaper 72. The transmission rate of the information outputted by the data generator 71 is made to be balanced by the traffic shaper 72 and then outputted to the network through the network interface 73. The output rate of the data generator 71 and the transmission rate from the traffic shaper 72 at the time t are represented as $r_S(t)$ and $r_T(t)$, respectively. The amount of information generated by the time t and the amount of information transmitted to the network by the time t are represented as $R_S(t)$ and $R_T(t)$, respectively.

This example of the conventional traffic shaping carries out buffering, and therefore the delay in transmission is caused. Regarding transmission of real-time data such as video data, if the delay in transmission exceeds a predetermined value, namely, the maximum acceptable delay D, the information, the cell in this example, is lost. Therefore, in the traffic shaper 72, the transmission rate $r_T(t)$ in transmitting the information to the ATM network within the time (t) is calculated based on the accumulating totals of the amount of information generation, namely, the amount of information $R_S(t)$ generated by the time (t) and the value of the maximum acceptable delay D in outputting the information on every generation of information to be inputted from the data generator 71 such as a picture coding device or the like or every predetermined control period, and the information is transmitted to the ATM network in accordance with the result of the calculation.

To explain it more concretely, the increase of delay in transmission is prevented by the control such that the accumulating totals of the amount of data transmitted to the network, that is, the amount of information $R_T(t)$ transmitted to the network by the time t is not less than the amount of information $R_S(t-D)$ generated by the time (t-D). The expression for calculating the transmission rate $r_T(t_0)$ at the time $t_0$ is as follows provided that the possible range of u is $0 \leq u \leq D$:

$$r_T(t_0) = \max((R_S(t_0+u-D) - R_T(t_0))/u)$$

FIG. 8 illustrates the operation of the conventional traffic shaping. In the figure, the reference numerals 81 and 82 are an input cell and an output cell, respectively. The figure shows that the input cell 81 is inputted to the traffic shaper 72 and the output cell 82 is outputted. The increase of delay in transmission is prevented by the control such that the line indicating the accumulating totals of the amount of data transmitted to the network, namely, the amount of information $R_T(t)$ is not below the line indicating the amount of information $R_S(t-D)$. In the example of the figure, the transmission rate $r_T(t)$ is calculated on every generation of the input cell 81. The above expression selects a line having the smallest gradient as the line indicating the amount of information $R_T(t)$ from lines above the line indicating the amount of information $R_S(t-D)$, and determines the transmission rate $r_T(t)$ based on the gradient.

The traffic shaping of the above-described conventional art deals with data to which the maximum acceptable delay D is set, such as video data. Consequently, calculation of the transmission rate on every generation of information to be inputted or in every predetermined time is necessary and complex hardware are required for conducting calculation. Thus the problem of a great burden in-peripheral processing is caused.

However, in file transfer or communication of the static image data or the like, there is no or little variation in the amount of data outputted from the data generator; accordingly, the influence of delay in transmission is small. In the case of transmission of such data, it is at the time of starting the communication accompanying severe increase of the transmission rate when the congestion is apt to occur by the severe increase of the traffic. Therefore, it is necessary to restrain severe increase of the traffic at the time of starting communication to prevent occurrence of the congestion in the network. The conventional art described above is somewhat effective in restraining increase of the traffic when the communication is started, but requires complex hardware and suffers a great burden in peripheral processing as also described.

Even in the course of communication, the congestion in the network is apt to occur by severe increase of the traffic; consequently, it is also effective to restrain severe increase of the traffic in the course of communication.

SUMMARY OF THE INVENTION

The present invention has been made in view of the above circumstances and has as an object a data transmission apparatus, a data transmission method which prevent severe increase of the transmission rate at the time of starting the communication in the variable bit-rate data transmission and a data communication system using thereof.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a digital data transmission apparatus of the present invention comprises digital data storing means for storing digital data to be transmitted, digital data output means for outputting the digital data stored in the digital data storing means to a transmission path, and control means for controlling a transmission rate which is an amount of data outputted per unit time by the digital data output means so that the transmission rate increases in accordance with passage of time.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENT

A preferred embodiment of a digital data transmission apparatus according to the present invention is now described in detail based on the drawings.

First Embodiment

Figure 1:
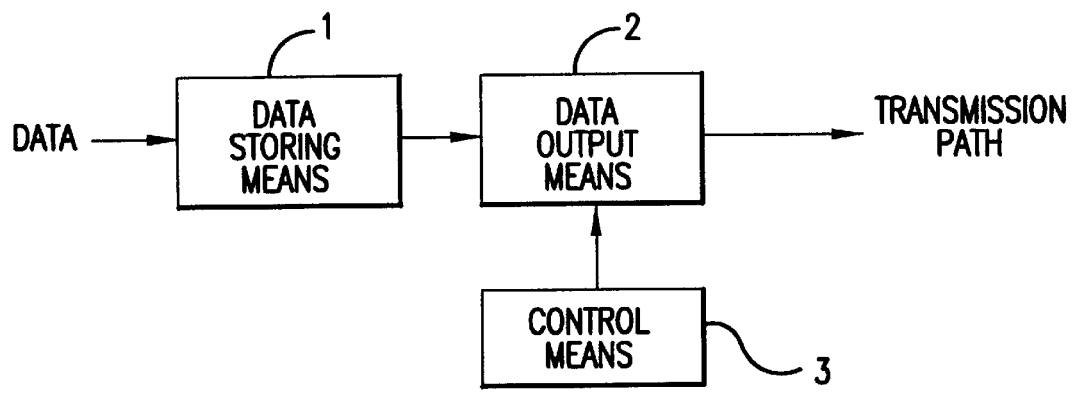
FIG. 1 is a schematic view illustrating the outline of the present invention.

FIG. 1 is a schematic view illustrating the present invention. In the figure, reference numeral 1 is data storing means, 2 is data outputting means, and 3 is control means. The data from the data generator to be transmitted is stored in the data storing means 1. The data stored in the data storing means 1 is outputted to the transmission path through the data outputting means 2. The control means 3 controls the amount of data outputted to the transmission path per a unit time by the data outputting means to make the transmission rate increase in course of time.

With such construction, the transmission rate of the data transmitted from the data transmission apparatus to the transmission path can be prevented from increasing severely at the time of starting communication or some time in course of communication. Thus severe increase of the traffic in a constituent in the network connected to the transmission path is restrained and occurrence of the congestion in the constituent in the network is prevented.

The conventional art is described on the assumption that the network is the B-ISDN using the ATM. However, the present invention can be applied to other networks as long as it uses the ATM. In the network using the ATM, the linear prediction of the amount of data to be transmitted is ordinarily conducted in the ATM switch. However, in the case where linear prediction of the amount of data to be transmitted is conducted in a transmission control device connected to the transmission path of the network and the transmission path to which the data outputting means is connected in the data transmission means on the side of the data transmission terminal which sends the cell, the same effect can be obtained as a result of operation.

In the local area network (LAN) or point-to-point communication system which is not connected to the constituent of the network such as the ATM switch, the present invention can be applied to the case of variable bit-rate transmission not executing flow control between nodes but utilizing various methods of predicting the amount of data to be transmitted such as the linear prediction. Accordingly, severe increase of the transmission rate of data to be transmitted from the data transmission apparatus to the transmission path at the time of starting the communication or in the course of communication and loss of data is prevented, thus guaranteeing the quality of service (QOS).

Figure 2:
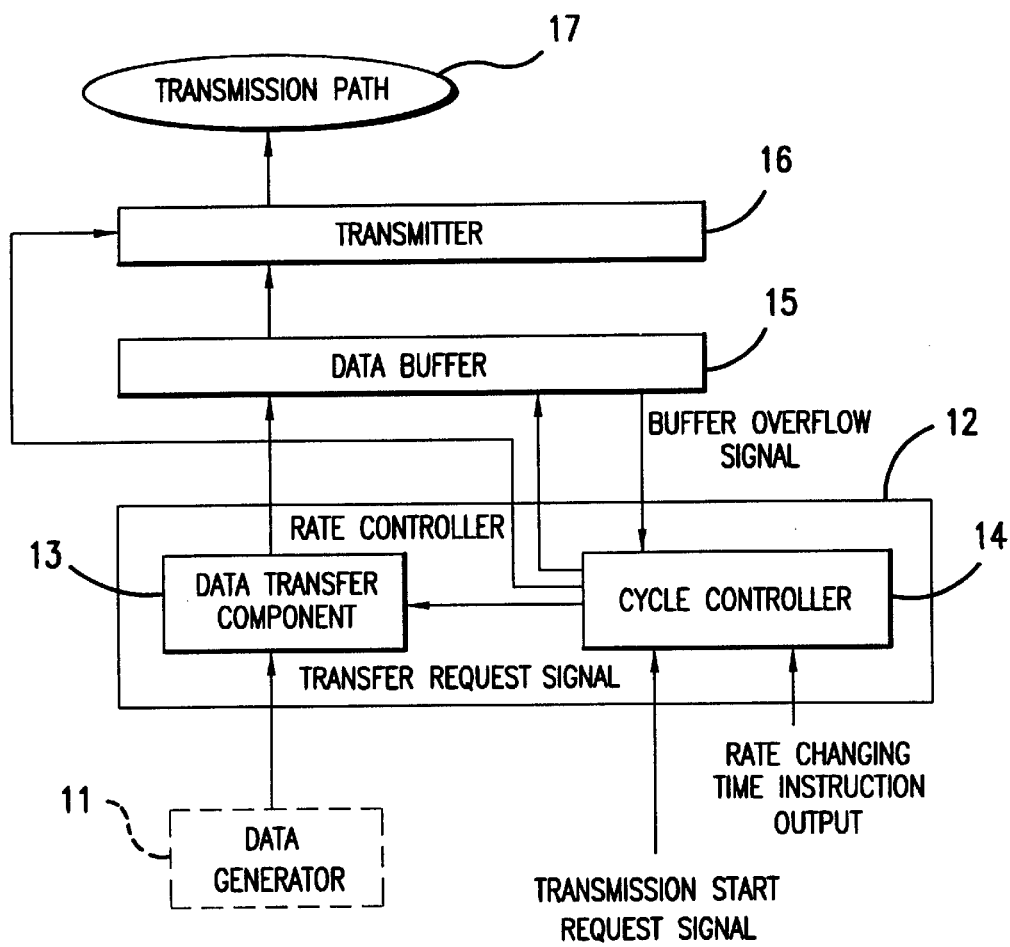
FIG. 2 is a block diagram showing a construction of an embodiment of a data transmission apparatus according to the present invention.

FIG. 2 is a block diagram showing an embodiment of the data transmission apparatus according to the present invention. In the figure, reference numeral 11 is a data generator, 12 is a rate controller, 13 is a data transfer component, 14 is a cycle controller, 15 is a data buffer, 16 is a transmitter and 17 is a transmission path. In this embodiment, it is assumed that the variable bit-rate high-speed data transmission is carried out point-to-point between a pair of terminals connected to each other by the transmission path 17 in the communication system using the ATM. In the transmitting terminal, the data generator 11 outputs the data to the data transfer component 13 in the rate controller 12. The data generator 11 generates, for example, data of a file or a static image or the like in which variation of the amount of data and influence caused by delay in transmission are small.

The rate controller 12 has the cycle controller 14 and receives a transmission start request signal, a rate changing time instruction signal and a buffer overflow signal, and then outputs various types of control signals to the data transfer component 13, data buffer 15 and the transmitter 16. The data transfer component 13 transfers the data to the data buffer 15. The data buffer 15 outputs the data to the transmitter 16 and outputs the buffer overflow signal to the cycle controller 14. The transmitter 16 outputs the data to the transmission path 17 of the network using the ATM.

The operation of this embodiment is explained. This embodiment adopts the data transmission method conducting the rate control at the time of starting the communication by controlling the amount of data to be transferred from the data generator 11 to the data buffer 15 by the rate controller 12.

When the transmission start request is notified, the data to be transmitted from the data generator 11 is temporarily stored in the data buffer 15 by the rate controller 12. That is, on receiving the transmission start request signal, the cycle controller 14 in the rate controller 12 outputs the transfer request signal to the data transfer component 13 in a predetermined time. The data transfer component 13 receives the transfer request signal and then transfers the data from the data generator 11 to the data buffer 15. The data buffer 15 receives the control signal from the cycle controller 14 and data from the data transfer component 13. The unit of transfer is one frame of frames of ATM Adaptation Layer (AAL) 5 prescribed by the ITU-T Recommendation . 362 and 363, and the transfer of one frame is completed within the time Ft.

The amount of data to be transferred to the data buffer 15 is controlled in a predetermined period of time, and transfer of the data to the data buffer 15 is started in a predetermined time after the start of the communication. The amount of data to be transferred to the data transfer buffer 15 per a unit time is gradually increased by the rate controller 12. That is, the rate changing time instruction output signal is inputted to the cycle controller 14 in advance, and the amount of data to be transferred to the data buffer 15 is increased in every predetermined time T based on the rate changing time instruction output signal. For example, the number of transfer request signal outputted in the time $T_1$ is increased by the predetermined number. As a result, the transfer rate of data to the data buffer 15 is increased. Here, the transfer rate of data is the amount of data transferred in a unit time.

Every completion of data transfer to the data buffer 15 is notified to the transmitter 16. The transmitter 16 transmits those transferred data to the transmission path 17. As the transmission start request is thus notified, increase of the traffic at the time of starting the communication is prevented by controlling the amount of data sent to the transmission path at a predetermined period of time.

Figure 3:
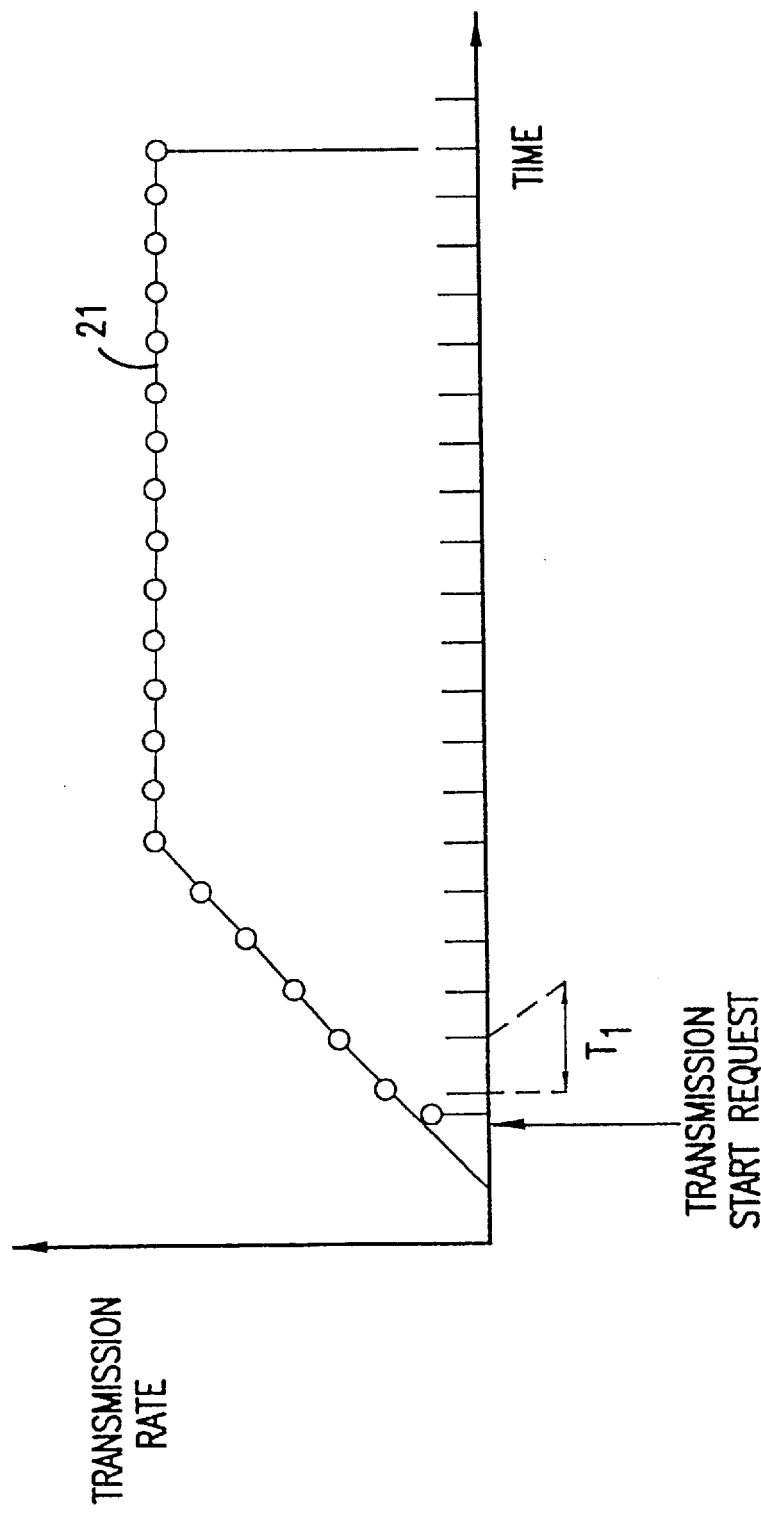
FIG. 3 is a graph illustrating rate changing in the embodiment of the data transmission apparatus according to the present invention.

FIG. 3 is a graph illustrating the rate changing in the embodiment of the present invention. In the figure, the horizontal axis indicates time and the vertical axis indicates the transmission rate represented by the transmission rate of data. The reference numeral 21 is a line linking the values of the transmission rate which increases by every predetermined time $T_1$. The transmission rate is the amount of data transmitted in a unit time.

The first data is transmitted to the transmission path slightly after the time when the transmission start request is made. The value of the transmission rate is increased by a predetermined value in the predetermined period $T_1$, and therefore the data is transmitted while the transmission rate is increased by steps, thus preventing the increase of the traffic at the time of starting the communication. When the number of periods comes to the predetermined value, the transmission rate of transmitter reaches the maximum value and after that the maximum transmission rate is maintained, and finally the transmission is completed. As a result, the line 21 linearly rises, and on and after the predetermined number of period, remains on the same level, and returns to 0 when the transmission is completed. As described later on, the transmission rate increases when the time T passes after the first data is transmitted owing to the internal construction of the cycle controller 14. However, the transmission rate may be regularly increased by a predetermined amount in every predetermined period $T_1$.

In this embodiment, the transmission rate is set to linearly increase by a predetermined rate, but it may be set to increase in a predetermined ratio and in geometrical progression. To increase the transmission rate in a predetermined ratio, for example, the number of transfer request signals transmitted by the cycle controller 14 in a unit time is increased in a geometrical progression. Instead of changing the transmission rate periodically in a predetermined period $T_1$, the time $T_1$ itself can be changed. In such case, if the time $T_1$ is set to be an integral multiplication of the predetermined time, the control in the cycle controller 14 is easily conducted.

To prevent the severe increase of the transmission rate to be transmitted from the data transmission apparatus to the transmission path 17 in the course of communication, instead of receiving the transmission request signal, the time when the amount of information generation in the data generator 11 is severely increased is detected and the cycle controller 14 may be controlled based thereon. However, it is necessary to appropriately change the internal construction of the cycle controller 14 such as setting of the amount of data to be transferred.

Here, the buffer overflow signal is explained based on FIG. 2. If any fault is detected in the transmitter 16, the transmitter 16 cannot transmit data in the data buffer 15 to the transmission path though the transfer of data is notified by the cycle controller 14. If such state continues, the stored data overflows the data buffer 15 and data absence occurs. Therefore, the data buffer 15 outputs the buffer overflow signal to the cycle controller ahead of time. The cycle controller 14 receives the signal and temporarily stops the output of the transfer request signal. If the fault is removed and the data is able to be transmitted to the transmission path again, the buffer overflow signal is reset and data transfer is started again. The fault detected in the transmitter 16 is, for example, a temporary stop of functions of a constituent of the network connected to the transmission path 17.

Figure 4:
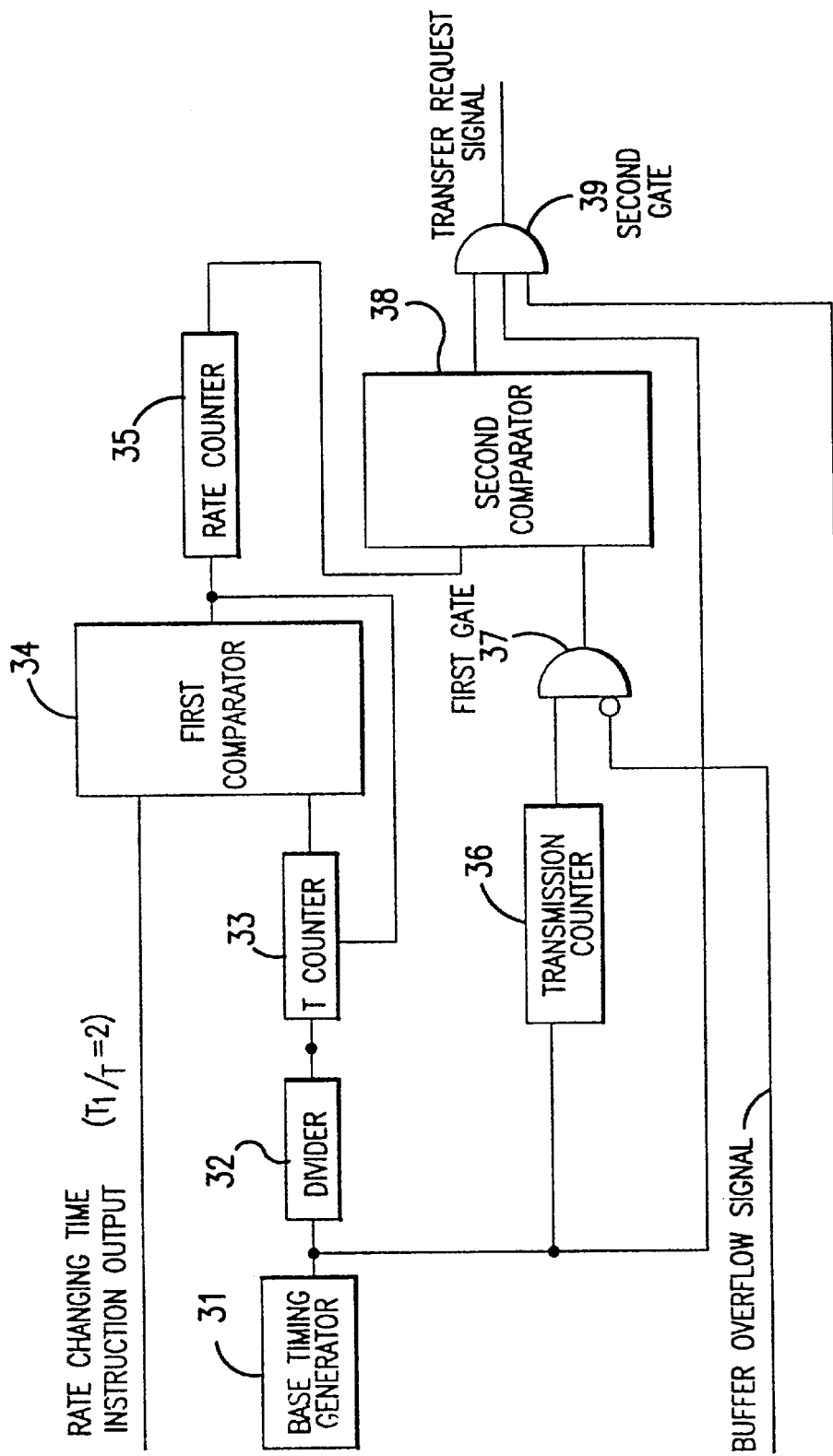
FIG. 4 is a block diagram showing a cycle controller of the embodiment of the data transmission apparatus according to the present invention.
Figure 5:
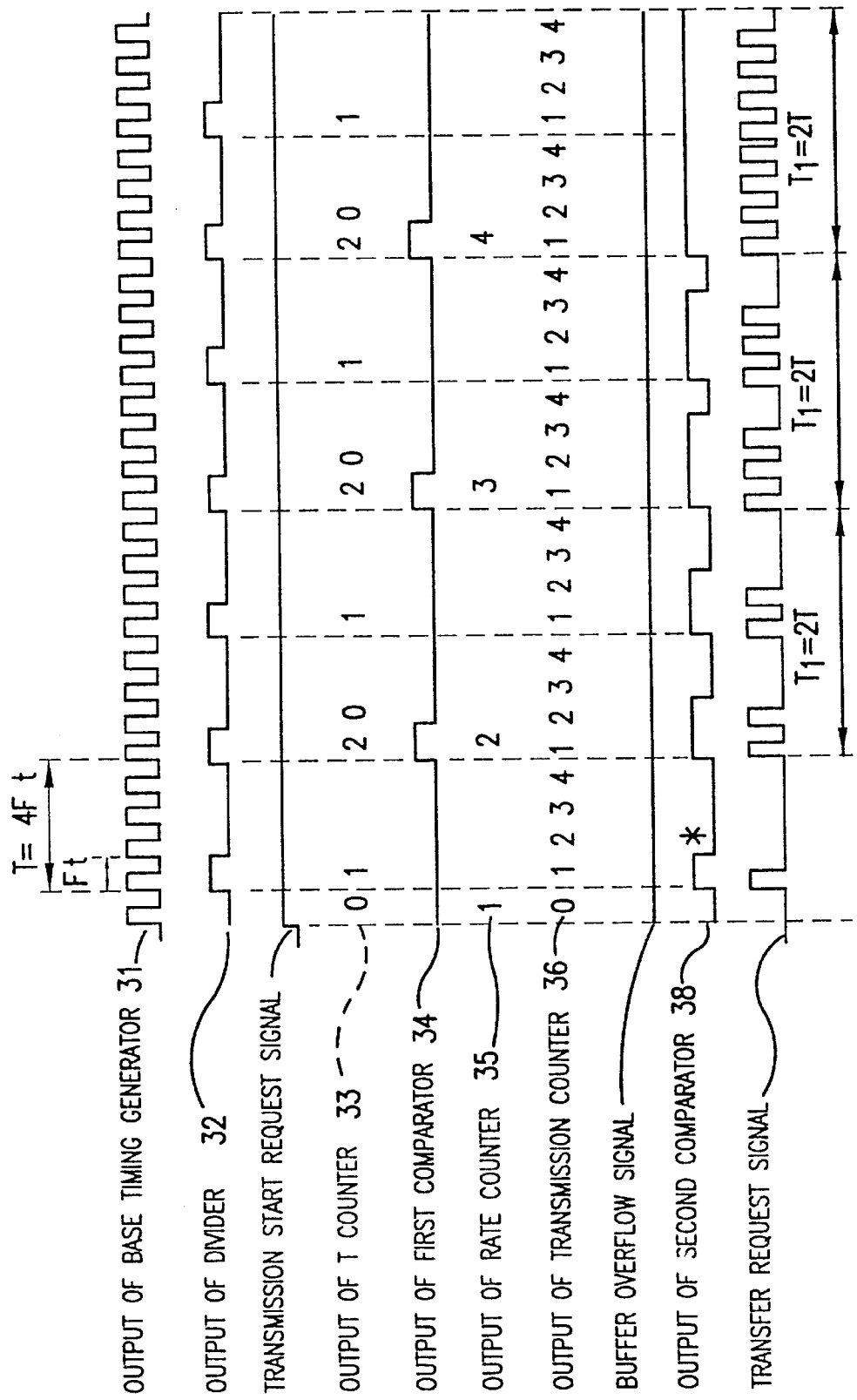
FIG. 5 illustrates operation of each component in the block diagram shown in FIG. 4.
Figure 6:
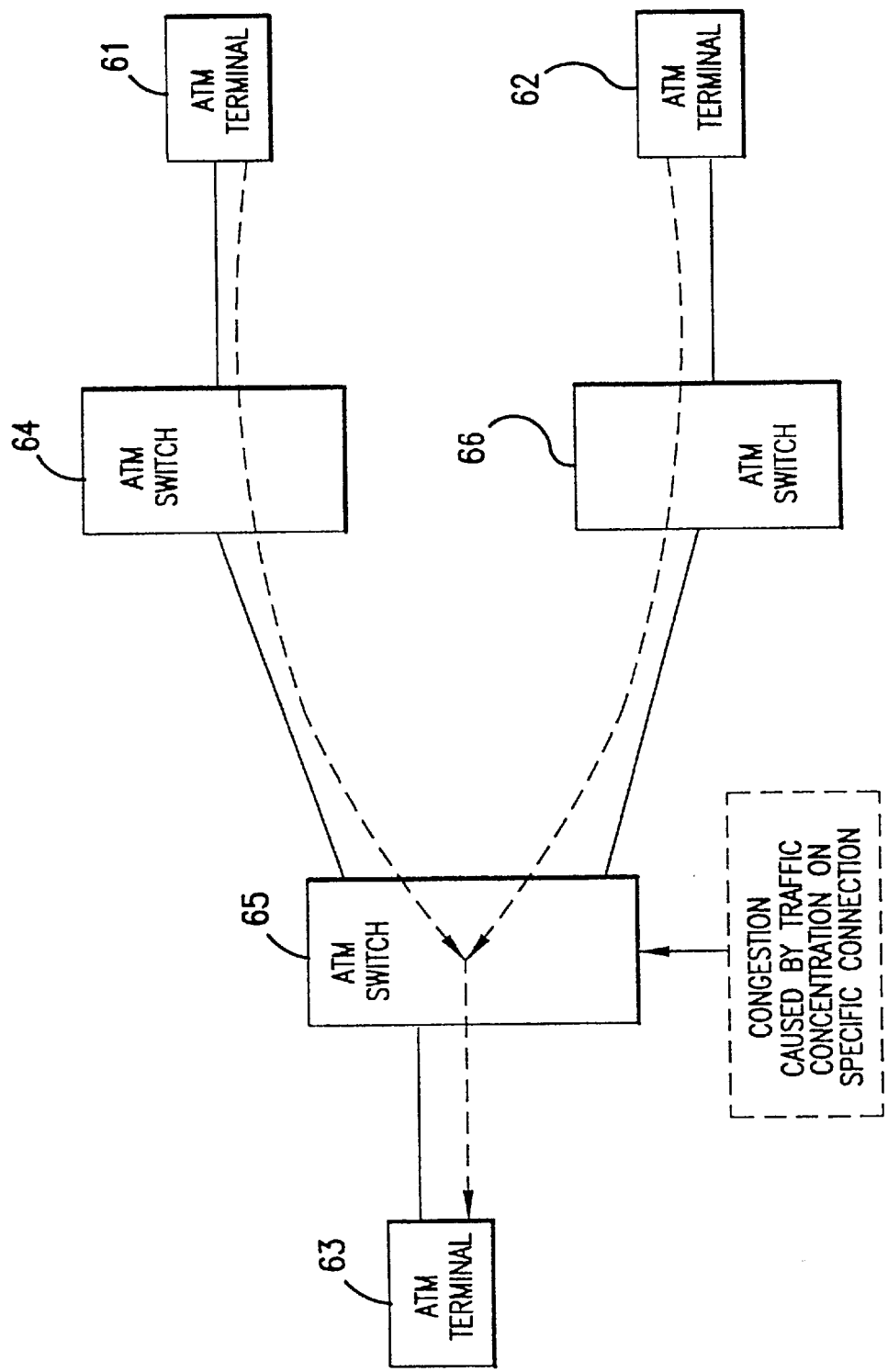
FIG. 6 is a system construction view showing an example of occurrence of the congestion in the network using the ATM.
Figure 7:
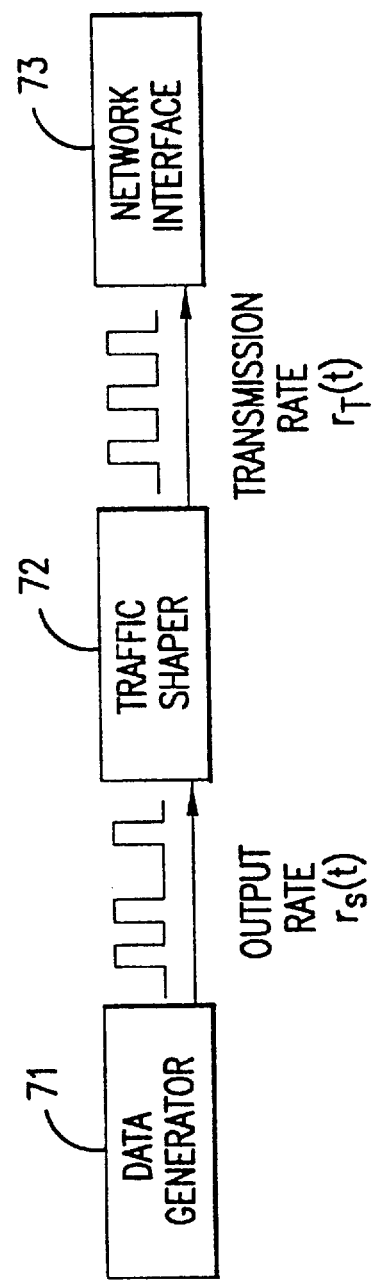
FIG. 7 shows a concept of conventional traffic shaping.
Figure 8:
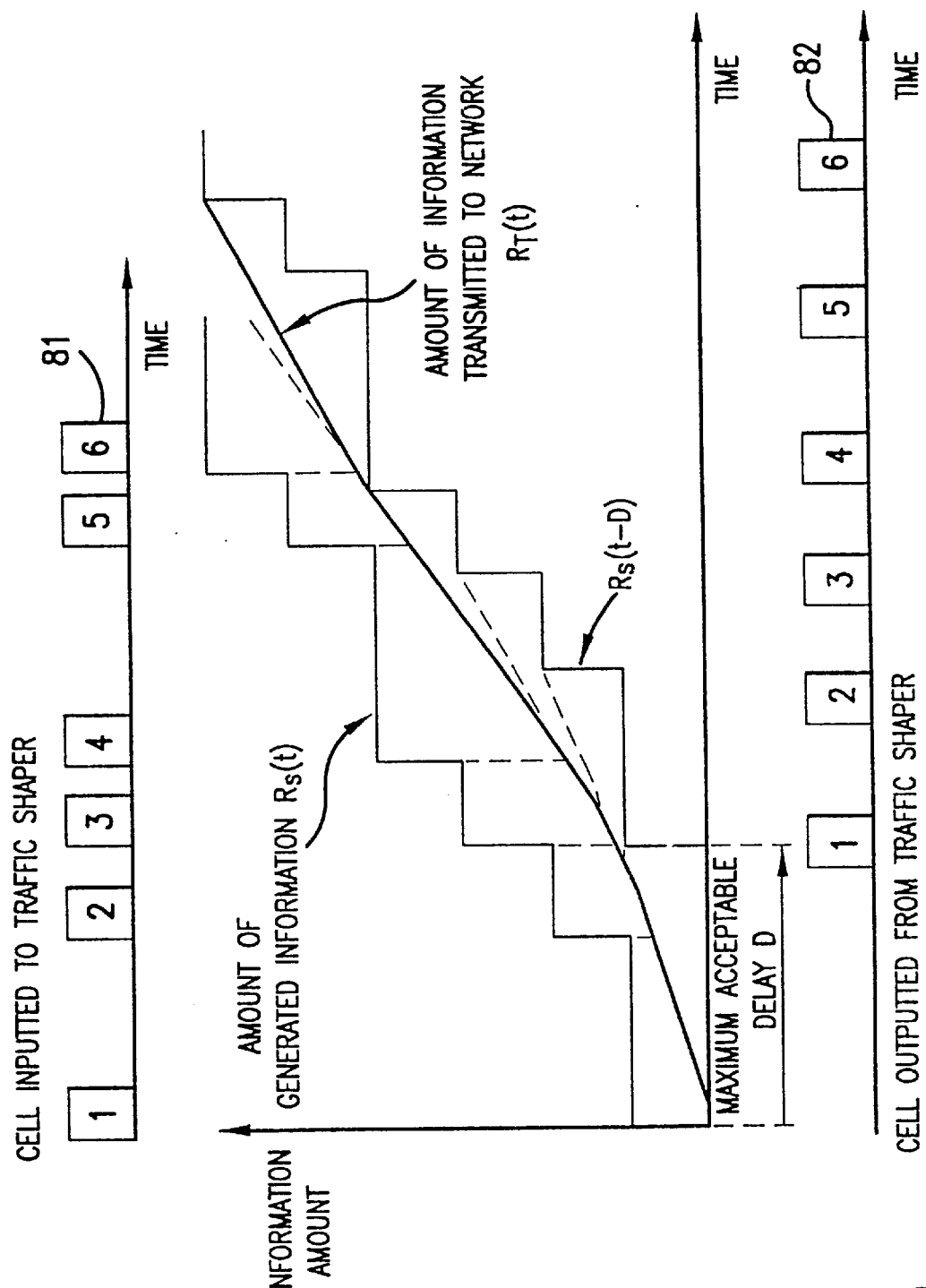
FIG. 8 illustrates operation of the conventional traffic shaping.

Next, an example of internal construction of the cycle controller 14 in the rate controller 12 is explained. FIG. 4 is a block diagram of the cycle controller and FIG. 5 illustrates operation of each component in the block diagram. In the figures, reference numeral 31 is a base timing generator, 32 is a divider, 33 is a T counter, 34 is a first comparator, 35 is a rate counter, 36 is a transmission counter, 37 is a first gate, 38 is a second comparator and 39 is a second gate.

In FIG. 4 the base timing generator 31 continuously operates to prepare a base timing output which has a period Ft. As previously explained with reference to FIG. 2, Ft is the time for transferring one frame among the frames of AAL 5. The divider 32, T counter 33, rate counter 35 and transmission counter 36 are cleared by the transmission start request signal.

The divider 32 divides the output from the base timing generator 31 and outputs the divisions to the T counter 33 in every T time, which is cleared by the transmission start request signal and then rises by first rising of the output pulse from the base timing generator 31. The T counter 33 is cleared by the transmission start request signal to be 0, and counts up and outputs a value on receiving the output from the divider 32, while it is cleared in synchronization with the output from the base timing generator 31 at the time of rising of the output pulse of the first comparator 34 which will be described later on.

The first comparator 34 compares the rate changing time instruction output and the output of the T counter 33. If these outputs match with each other, the first comparator 34 rises an output pulse. Here, the rate changing time instruction output instructs a value obtained by dividing the rate changing time $T_1$ by the period T of the output of the divider 32.

The rate counter 35 is cleared by the transmission start request signal to be 1, and then counts up the value on receiving the output of the first comparator 34. As a result, the output of the rate counter 35 starts with 1 at the time of starting the transmission, and the value is counted up in every $T_1$. The maximum counter value of the rate counter 35 is assumed to be the maximum number of the transfer request signals generated in the period T or more. However, if the counter value returns to 0 from the maximum counter value before the transmission is completed, the rate controller 12 does not operate normally; therefore, when the counter value reaches an adequate value which is equal to the above-described maximum value or more, it is desirable to maintain the counter value.

The transmission counter 36 is cleared by the transmission start request signal so as to output 0, and then the value is counted up on receiving the output of the base timing generator 31. The value is set to return to 1 when it reaches the predetermined value. The predetermined value is, for example, set to be equal to the value which the transmission counter 36 counts up during one period of the output of the divider 32. The output of the transmission counter 36 is inputted to the first gate 37 with the reverse output of the buffer overflow signal, and the output of the first gate 37 is transmitted to the second comparator 38. If there is a sufficient empty space in the data buffer 15, the buffer overflow signal is inactive. In such a case, the output value of the transmission counter 36 is directly regarded as the output value of the first gate 37.

The second comparator 38 compares the output of the first gate 37 and the output of the rate counter 35, and then rises the output pulse and transmits it to the second gate 39 if the output value of the first gate 37 is equal to the output value of the rate counter 35 or less, and not 0. The second gate 39 receives the transmission start request signal, the outputs from the second comparator 38 and the base timing generator 31, and then outputs the transfer request signal with the timing of the output of the base timing generator 31 when both output pulses of transmission start request signal and the second comparator 38 are rising.

The operation of the cycle controller 14 in FIG. 4 is illustrated utilizing an example with reference to FIG. 5. The period T of the output of the divider 32, the rate changing time $T_1$ and the rate changing time instruction output are assumed to be $T=4F_t$, $T_1=2T$ and $T_1/T=2$, respectively. As the output of the base timing generator 31, a square wave having a period of length $F_t$ is used, and the output pulse of the divider 32 is risen at the interval of every T which is equal to $4F_t$. As the transmission start request signal is active, the divider 32, T counter 33, rate counter 35 and transmission counter 36 are cleared.

The output value of the T counter 33 comes to 1 by the first rising of the output pulse of the divider 32, and comes to 2 by the next rising. At this time, the output value of the T counter 33 matches with the instructed value 2 of the rate changing time instruction output, whereby the output pulse of the first comparator 34 rises, the rate counter 35 counts up the output value from 1 when it was cleared to 2, and on and after that, counting up of the output value of the T counter 33 is continued on receiving the rising of the output pulse of the first comparator 34. At the same time, when the output pulse of the first comparator 34 rises, the output value of the T counter 33 is cleared to be 0 at the point of time of next fall of the output pulse of the divider 32. Thus counting up and clearance are repeated in the this way.

The transmission counter 36 receives the output of the base timing generator 31 and counts up the counter value from 0 which is the value when cleared. When the counter value becomes 4, it is returned to 1, and on and after that, counter values from 1 to 4 are periodically repeated.

In the second comparator 38, the output thereof is at first 0 because the output value of the transmission counter 36 is 0 and consequently the output value of the first gate 37 is 0. Therefore, the transfer request signal is inactive at the second gate 39. During the first one period of the output pulse of the divider 32, the output pulse of the second comparator 38 rises when the output value of the transmission counter 36 is 1. During the second and third periods of the output pulse of the divider 32, the output pulse of the second comparator 38 rises when the output value of the transmission counter 36 is 1 or 2. During the fourth and fifth periods of the output pulse of the divider 32, the output pulse of the second comparator 38 rises when the output value of the transmission counter 36 is 1 or 3. On and after the sixth period of the output of the divider 32, the output pulse of the second comparator 38 rises continuously.

As a result, when the buffer overflow signal is inactive, the transfer request signal having a pulse width of $F_t/2$ is outputted once during first one period T of the output pulse of the divider 32, twice in each of the second and third periods, three times in each of the fourth and fifth periods, and four times in each of the sixth and subsequent periods.

As clear from the above description, the number of the transfer request signal generated in the period T is increased one by one in every $T_1/T$ instructed by the rate changing time instruction output. The dividing ratio of the divider 32 and the maximum counter value of the transmission counter 36 determine the maximum number of the transfer request signal generated in the period T. Accordingly, the transfer rate and the increasing characteristic of the transmission rate can be changed by properly changing the value of the rate changing time instruction output, dividing ratio, maximum counter value or the like. This change can be made at an arbitrary point of time: the change may be carried out before starting the communication, or in the course of communication.

Based on the above-described generation of the transfer request signal, after generation of the transmission start request signal and a slight delay therefrom, the amount of data to be transferred to the data buffer 15 is increased by one frame in every $T_1=2T$ after first T, thus increasing the transfer rate. As notified by the cycle controller 14 that the data is transferred to the data buffer 15, the transmission component 16 transmits the data to the transmission path, whereby the transmission rate when the transmission component 16 executes transmission also increases in every $T_1=2T$.

The internal construction of the cycle controller 14 described with reference to FIGS. 4 and 5 can be variously changed. For example, in FIG. 4, instead of the transmission counter 36 which outputs 1 after outputting 4, the transmission counter 36 may be used in which the value 1 is loaded on every counting up of the output value of the T counter 33 or every rising of the output pulse of the divider 32.

In this embodiment, immediately after the first data is transferred to the data buffer 15, the transfer rate and the transmission rate increase by a predetermined value after the time T, not $T_1$, has passed. However, it may be possible to increase the transfer rate and the transmission rate by a predetermined value in a permanent predetermined period $T_1$. For example, in FIG. 5, the construction can be changed so that the T counter 33 is cleared to output 0 at the point of * where the output pulse of the second comparator 38 first falls.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A digital data transmission apparatus comprising:

digital data storing means for storing digital data to be transmitted;

digital data output means for outputting said digital data stored in said digital data storing means to a transmission path; and control means for controlling a transmission rate which is an amount of data outputted per a unit time by said digital data output means so that said transmission rate increases in accordance with passage of time, said control means comprising:

transfer request signal output means for outputting a transfer request signal which requests said digital data output means to output said digital data to said transmission path; and cycle control means for increasing the number of said transfer request signals output by said transfer request signal output means in every predetermined time, said digital data output means transmits a predetermined amount of said digital data to said transmission path in accordance with said transfer request signal output by said transfer request signal output means.

2. The digital data transmission apparatus according to claim 1, wherein said control means controls said transmission rate so that said transmission rate increases in every predetermined time.

3. The digital data transmission apparatus according to claim 1, wherein said control means controls said transmission rate so that said transmission rate increases by a predetermined rate.

4. The digital data transmission apparatus according to claim 1, wherein said control means controls said transmission rate so that said transmission rate increases until said transmission rate reaches a maximum transmission rate of said digital data output means.

5. A digital data transmission method comprising the steps of:

storing digital data to be transmitted to a transmission path;

outputting said stored digital data to said transmission path; and controlling a transmission rate which is an amount of data outputted to said transmission path per a unit time so that said transmission rate increases in accordance with the passage of time, the controlling step comprising:

outputting a transfer request signal which requests that the digital data be output to the transmission path;

increasing the number of the transfer request signals output in every predetermined time; and transmitting a predetermined amount of the digital data to the transmission path in accordance with each output transfer request signal.

* * * * *